United States Patent
Nakamura

(10) Patent No.: US 6,621,539 B2
(45) Date of Patent: Sep. 16, 2003

(54) REFLECTIVE TYPE LCD AND METHOD OF MANUFACTURING THE SAME

(75) Inventor: Sadao Nakamura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 169 days.

(21) Appl. No.: 09/836,925

(22) Filed: Apr. 17, 2001

(65) Prior Publication Data

US 2001/0043296 A1 Nov. 22, 2001

(30) Foreign Application Priority Data

May 18, 2000 (JP) .................... 2000-146864

(51) Int. Cl.[7] .................... G02F 1/1335; G02F 1/1333
(52) U.S. Cl. .................... 349/110; 349/106; 349/113
(58) Field of Search .................... 349/106, 107, 349/108, 109, 110, 111, 113; 438/70

(56) References Cited

U.S. PATENT DOCUMENTS

| 5,220,444 | A | | 6/1993 | Mitsui et al. | |
|---|---|---|---|---|---|
| 5,990,992 | A | * | 11/1999 | Hamanaka et al. | ........... 349/95 |
| 6,476,890 | B1 | * | 11/2002 | Funahata et al. | ........... 349/113 |

* cited by examiner

*Primary Examiner*—John F. Niebling
*Assistant Examiner*—Viktor Simkovic
(74) *Attorney, Agent, or Firm*—Beyer Weaver & Thomas, LLP

(57) ABSTRACT

A method of manufacturing a reflective type LCD includes the steps of forming one color layer on an approximately overall surface of a display region of a substrate, forming a reflective layer on an approximately overall surface of the one color layer, and partly removing the reflective layer and exposing a pattern of the one color layer through the remaining reflective layer, whereby a reflective type LCD having high display quality can be provided.

5 Claims, 6 Drawing Sheets

REFLECTIVE TYPE LCD AND METHOD OF MANUFACTURING THE SAME

BACKGROUND OF THE INVENTION

1. Field of the Invention

The present invention relates to a reflective type LCD, for example, a STN (super twisted nematic) type LCD, a TFT (thin film transistor) type LCD, and the like, and more specifically, to a reflective type LCD relating a construction of a reflective layer and a color layer thereof and to a method of manufacturing the same.

2. Description of the Related Art

A color filter with a reflective layer is used in a color reflective STN type LCD, and a reflection plate is used in a black and white STN type LCD, respectively.

FIG. 6 is a view explaining a manufacturing process of a conventional color filter with a reflective layer. First, as shown in FIG. 6A, after a hill and valley forming resist layer 52 is formed on a glass substrate 51 by coating photosensitive resin thereon and fine hills and valleys are formed on a surface of the resist layer 52 (FIG. 6B), exposure L is executed to the resist layer 52 with a mask 53 placed thereon (FIG. 6C), and a hard resin layer 54 is formed by developing and post baking the resist layer 52 (FIG. 6D).

Next, as shown in FIG. 6E, a reflective layer 55 composed of aluminum or the like is formed on the hard resin layer 54, a black mask resist 56 is coated on the reflective layer 55 (FIG. 6F), thereafter a black mask 57 having a predetermined pattern is formed on the reflective layer 55 by exposing and developing the black mask resist 56 (FIG. 6G). A blue filter 58, a green filter 59, and a red filter 60 are sequentially formed by the same manner, that is, by repeatedly coating, exposing and developing resists. (FIG. 6H).

Thereafter, the thus obtained substrate is entirely covered with an overcoat layer 61 (FIG. 6I), and then a protective layer 62 composed of $SiO_2$ and a transparent electrode 63 composed of ITO are sequentially formed on the overcoat layer 61 (FIG. 6J), whereby the color filter with the reflective layer is constructed.

FIG. 7 is a partly enlarged sectional view of the color filter, wherein color filters such as the blue filter 58, the green filter 59, the red filter 60 and the like are formed with edges 64 thereof overlapping the black mask 57 in order to prevent leakage of light. The black mask 57 is formed to improve characteristics by improving contrast.

As shown in FIG. 7, in the conventional color filter with the reflective layer, since the edges 64 of the color filters overlap the black mask 57, the edges 64 project upward and have a step $\Delta t1$ of about 1 $\mu$m which approximately corresponds to a thickness of the black mask 57.

While a surface of the color filter with the reflective layer is flattened by coating the overcoat layer 61, a sufficient surface flattening effect cannot be obtained by the overcoat layer 61 because projections formed by the overlapped edges 64 have an area smaller than that of the portions of only the color filters. Thus, even if the overcoat layer 61 is formed, a step $\Delta t2$ of about 0.5 to 1 $\mu$m remains on a surface of the overcoat layer 61. Thus, there is a drawback that the step adversely affects display quality of a LCD.

Since very strict gap accuracy is required particularly to the STN type LCD, flatness having a higher degree of precision is indispensable to the STN type LCD.

SUMMARY OF THE INVENTION

Accordingly, an object of the present invention is to overcome the above drawbacks of the conventional art and to provide a reflective type LCD having high display quality and a method of manufacturing the same.

To achieve the above object, the present invention is characterized by including a substrate, for example, a glass substrate or the like, one color layer, for example, a black mask or the like formed on an approximately overall surface of a display region of the substrate, and a reflective layer composed of, for example, aluminum or the like and covering the other portion of the color layer excluding a desired pattern portion thereof, wherein the pattern of the one color layer is exposed through the reflective layer.

The above invention is characterized in that the one color layer is a black and white type black mask.

The above invention is characterized in that the one color layer is a color type black mask, a color filter having a blue filter, a green filter, and a red filter is disposed on the reflective layer, and edges of the color filter partly overlap the black mask.

The above invention is characterized in that fine hills and valleys are formed on a surface of the one color layer.

The above invention is characterized in that the LCD is a STN (super twisted nematic) type LCD.

Further, the present invention is characterized by including the steps of forming one color layer, for example, a black mask or the like on an approximately overall surface of a display region of a substrate, for example, a glass substrate or the like, forming a reflective layer composed of, for example, aluminum or the like on an approximately overall surface of the one color layer and partly removing the reflective layer and exposing a pattern of the one color layer through the remaining reflective layer.

The above invention is characterized in that the one color layer is a white and black type black mask.

The above invention is characterized in that the one color layer is a black mask and the invention includes the step of patterning a color filter having a blue filter, a green filter, and a red filter on the remaining reflective layer and partly overlapping edges of the color filter on the black mask.

The above invention is characterized by including the step of forming fine hills and valleys on a surface of the one color layer.

The above invention is characterized in that the LCD is a STN (super twisted nematic type) LCD.

DESCRIPTION OF THE PREFERRED EMBODIMENTS

Figure 1:
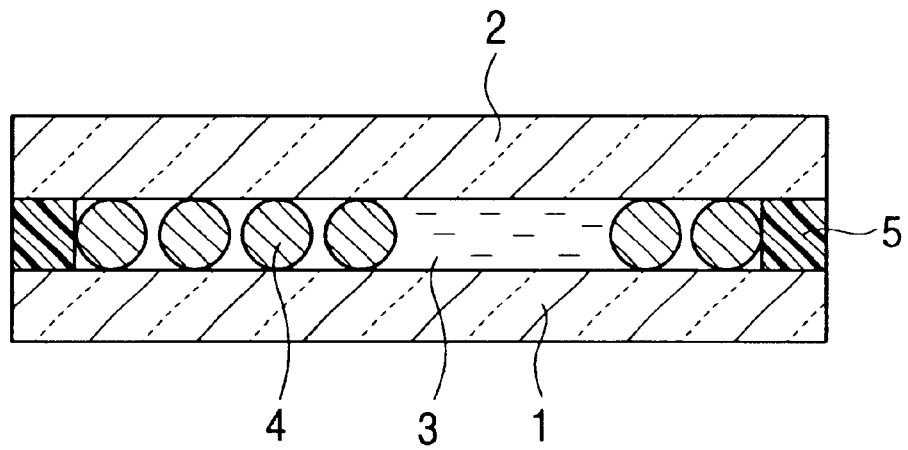
FIG. 1 is a sectional view of a STN type LCD according to an embodiment of the present invention.
Figure 2:
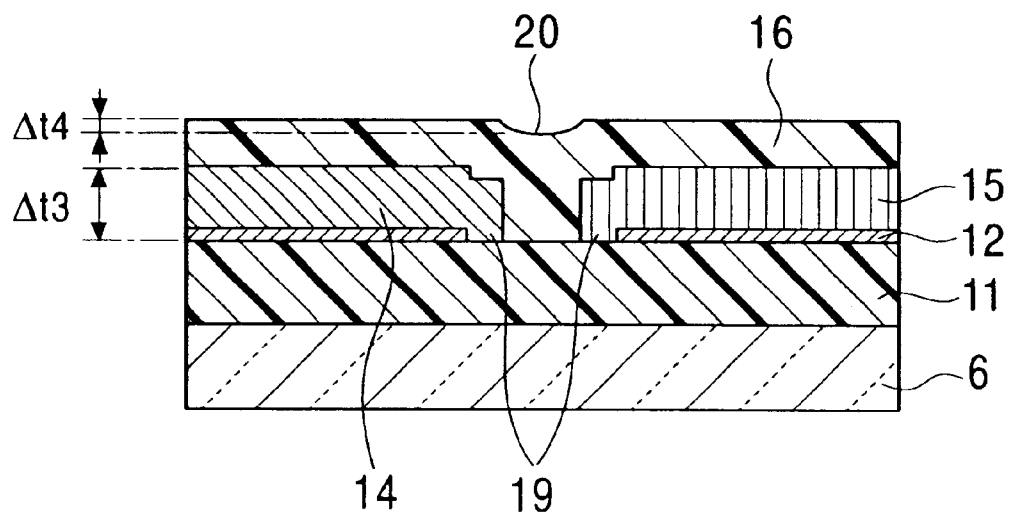
FIG. 2 is an enlarged view of a main portion of a color filer with a reflective layer according to a first embodiment using to the LCD.

Next, embodiments of the present invention will be described with reference to the drawings. FIG. 1 is a sectional view of a STN type LCD, FIG. 2 is an enlarged sectional view of a main portion of a color filter according to a first embodiment, and FIG. 3 is a view explaining a manufacturing process of the color filter.

As shown in FIG. 1, the STN type LCD is arranged such that a liquid crystal layer 3, which is twisted at least 180°, is interposed between a first substrate 1, which has a color filter with a reflective layer, and a second transparent substrate 2, spacer particles 4 are disposed in the liquid crystal layer 3 to keep a gap between the substrates 1 and 2 to a predetermined value (for example, 6 $\mu$m±0.1 to 0.2 $\mu$m), and outer peripheries of the substrates 1 and 2 are hermetically sealed liquid-tightly by a sealing agent 5.

Next, a manufacturing process of the color filter with the reflective layer used in the LCD will be described with reference to FIG. 3.

Figure 3A:
FIG. 3 is a view explaining a manufacturing process of the color filter with the reflective layer.
Figure 3B:
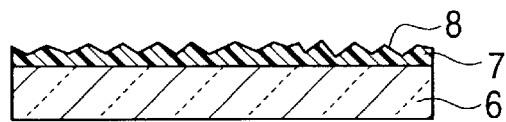
Figure 3C:
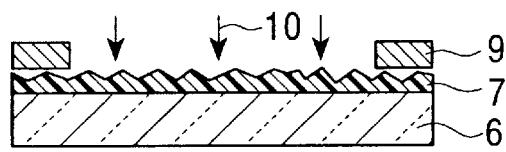
Figure 3D:
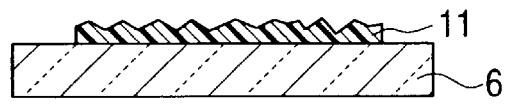

As shown in FIG. 3A, a black mask resist layer 7 is formed on a glass substrate 6 by coating photosensitive resin such as acrylic resin or the like containing black pigment thereon in a predetermined thickness, minute hills and valleys 8 are formed on a surface of the resist layer 7 to provide it with a light diffusing property (FIG. 3B), exposure 10 is executed to the resist layer 7 with a mask 9 placed thereon (FIG. 3C), and a black mask 11 is formed on an approximately overall surface of a display region of the resist layer 7 by developing and post-baking it (FIG. 3D).

Figure 3E:
Figure 3F:
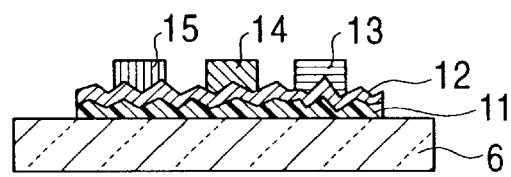

Next, as shown in FIG. 3E, a reflective layer 12 composed of aluminum, silver or the like is formed on an overall surface of the black mask 11 by sputtering, vapor deposition or the like. A blue filter 13 having a predetermined pattern is formed on the reflective layer 12 by coating a blue filter resist composed of photosensitive resin, for example, acrylic resin or the like containing blue pigment on the reflective layer 12 and exposing, developing, and post baking the resist. Then, a green filter 14 and a red filter 15 are sequentially formed by the same manner (FIG. 3F).

Figure 3G:
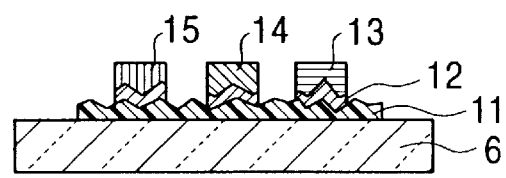

The thus formed color filters 13 to 15 are masked and an exposed portion of the reflective layer 12 is removed by etching so as to expose the black mask 11 thereunder, which permits a pattern of the black mask 11 to appear through the reflective layer 12 and the color filters 13 to 15 (FIG. 3G).

Figure 3H:
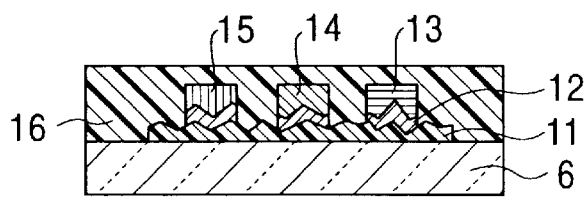
Figure 3I:
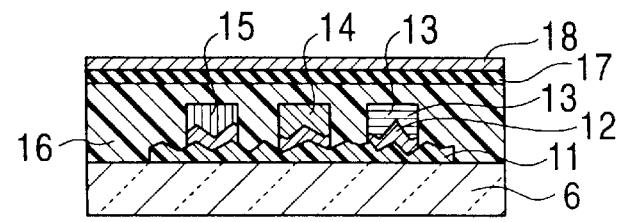

Subsequently, as shown in FIG. 3H, the thus obtained substrate is entirely covered with a transparent overcoat layer 16 composed of acrylic resin or the like, and then a protective layer 17 composed of $SiO_2$ and a transparent electrode 18 composed of ITO are sequentially formed on the overcoat layer 16 (FIG. 3I), whereby the color filter with the reflective layer is constructed.

FIG. 2 is an enlarged sectional view of the color filter obtained by this manufacturing process, wherein the black mask 11 is formed on the approximately overall display region on the glass substrate 6, the reflective layer 12 is formed on the other portion of the black mask 11 excluding a desired pattern portion thereof, and the black mask 11 is exposed through the reflective layer 12. Further, the desired color filters 13 to 15 are formed on the reflective layer 12, and edges 19 of the color filters 13 to 15 overlap a part of a surface of the black mask 11 across the reflective layer 12 to prevent leakage of light. Since the edges 19 of the color filters 13 to 15 step down to the black mask 11 side, when the overcoat layer 16 is formed, slight recesses 20 are formed thereon at positions corresponding to the stepped-down portions of the edges 19.

After the color filters 13 to 15 are formed, a step$\Delta$t3 between them and the black mask 11 is about 0.7 $\mu$m which is a sum of a thickness of the reflective layer 12 and a thickness of each of the color filters 13 to 15. Further, when the overcoat layer 16 is formed and a surface thereof is flattened, a surface step$\Delta$t4 of the overcoat layer 16 is reduced to about 0.15 $\mu$m which corresponds to a depth of each recess 20 because a large flattening effect can be obtained due to the stepped portion having a narrow width.

FIG. 4 is a view explaining a manufacturing process of a color filter with a reflective layer according to a second embodiment of the present invention.

Since steps A to E of FIG. 4 are similar to those of the manufacturing process of the above first embodiment, description thereof is omitted. As shown in FIG. 4F, a reflective layer patterning resist 21 is coated on a reflective layer 12 and exposed and developed at step shown in FIG. 4G, and an exposed portion of the reflective layer 12 is removed by etching at step shown in FIG. 4G so as to expose a black mask 11 thereunder, whereby a pattern of the black mask 11 appears through the reflective layer 12. Thereafter, the resist layer on the reflective layer 12 is exfoliated.

Figure 4A:
FIG. 4 is a view explaining a manufacturing process of a color filter with a reflective layer according to a second embodiment of the present invention.
Figure 4B:
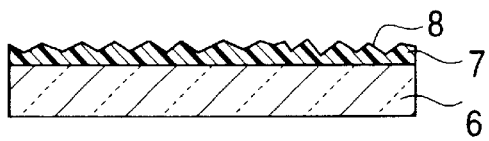
Figure 4C:
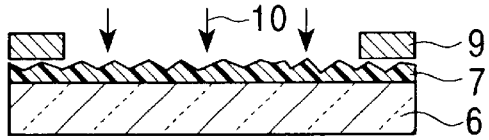
Figure 4D:
Figure 4E:
Figure 4F:
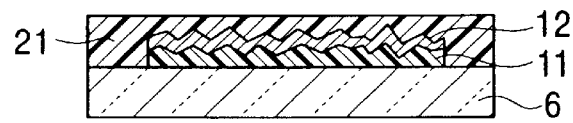
Figure 4G:
Figure 4H:
Figure 4I:
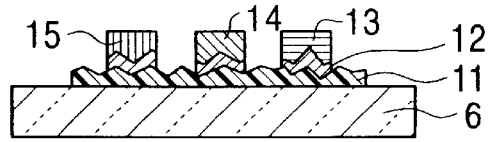

Subsequently, as shown in FIG. 4I, a blue filter 13 having a predetermined pattern is formed on the reflective layer 12 by coating a blue filter resist composed of photosensitive resin, for example, acrylic resin or the like containing blue pigment on the reflective layer 12, and by exposing, developing and post-baking the resist. Then, a green filter 14 and a red filter 15 are sequentially formed by the same manner.

Figure 4J:
Figure 4K:
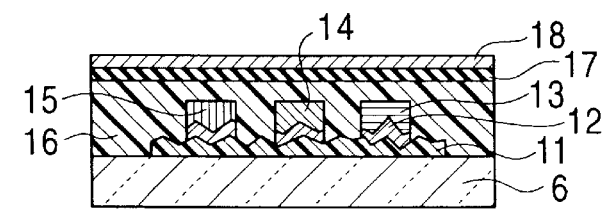

Subsequently, as shown in FIG. 4J, a thus obtained substrate is entirely covered with an overcoat layer 16, and then a protective layer 17 composed of $SiO_2$ and a transparent electrode 18 composed of ITO are sequentially formed on the overcoat layer 16 (FIG. 4K), whereby the color filter with the reflective layer is constructed.

FIG. 5 is a view explaining a manufacturing process of a black and white reflection plate according to a third embodiment of the present invention.

Figure 5A:
FIG. 5 is a view explaining a manufacturing process of a black and white reflection plate according to a third embodiment of the present invention.
Figure 5B:
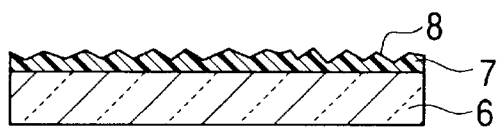
Figure 5C:
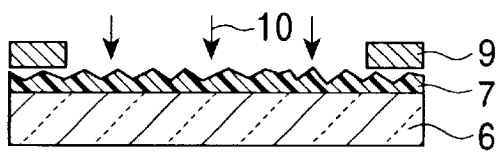
Figure 5D:
Figure 5E:
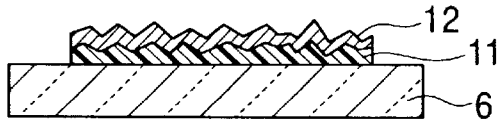
Figure 5F:
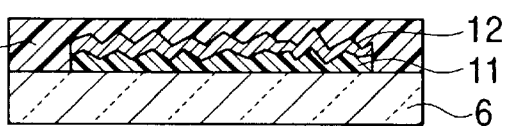
Figure 5G:
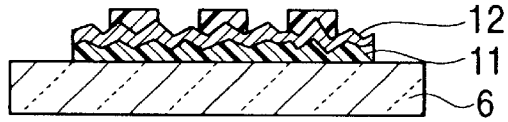
Figure 5H:

Since steps of FIGS. 5A to 5H are similar to those of the manufacturing process of the above second embodiment, description thereof is omitted. As shown in FIG. 5H, A black mask 11 as an underlayer is exposed by removing an exposed portion of a reflective layer 12 by etching, whereby a pattern of the black mask 11 appears through the reflective layer 12.

Figure 5I:
Figure 5J:
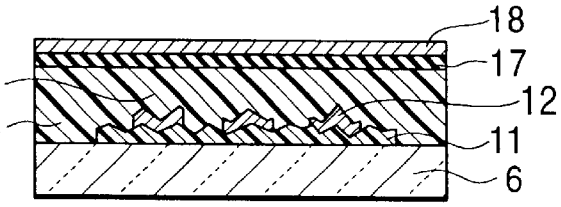
Figure 6A:
FIG. 6 is a view explaining a manufacturing process of a conventional color filter with a reflective layer.
Figure 6B:
Figure 6C:
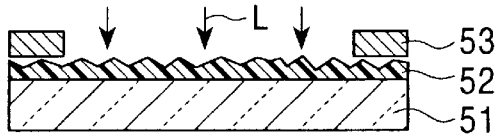
Figure 6D:
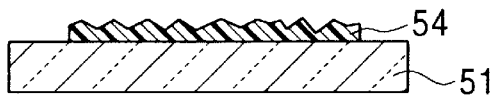
Figure 6E:
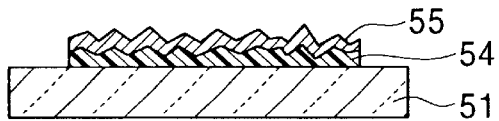
Figure 6F:
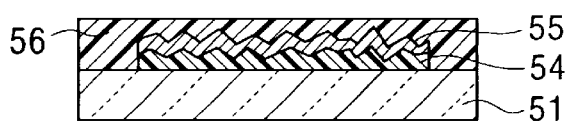
Figure 6G:
Figure 6H:
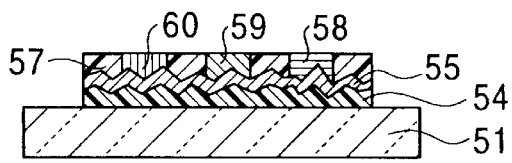
Figure 6I:
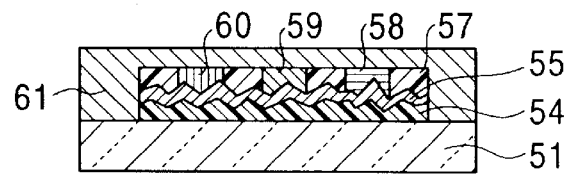
Figure 6J:
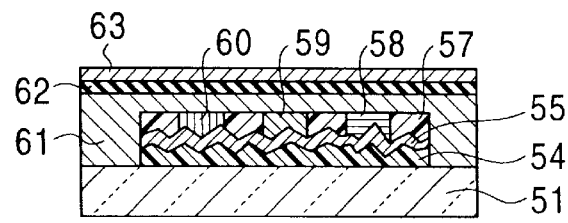
Figure 7:
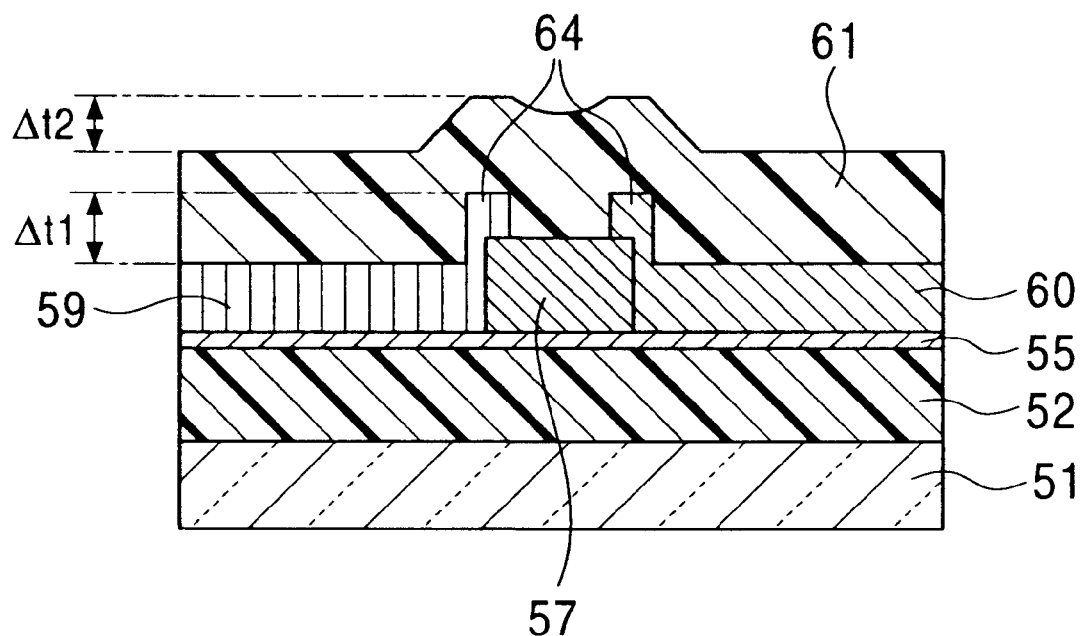
FIG. 7 is an enlarged sectional view of the conventional color filter with the reflective layer.

Next, as shown in FIG. 5I, a thus obtained substrate is entirely covered with an overcoat layer 16, and then a protective layer 17 composed of $SiO_2$ and a transparent electrode 18 composed of ITO are sequentially formed on the overcoat layer 16 (FIG. 5J), whereby a black/white reflection plate is constructed.

While the STN type LCD has been described in the above embodiments, the present invention also is applicable to other types of LCDs such as a TFT type LCD and the like.

Since the present invention is constructed as described above, a reflective type LCD, which has a reduced step on a surface, improved surface flatness and high display quality, and a manufacturing method of the same can be provided.

Since the present invention is constructed as described above, characteristics of a black and white type LCD can be enhanced by improving contrast.

Since the present invention is constructed as described above, characteristics of a color type LCD can be enhanced by improving contrast.

While a step for forming a hard resin layer for carrying a reflective layer is necessary in a conventional manufacturing method, the black mask of the present invention also acts as a layer for carrying the reflective layer. Accordingly, the manufacturing process of the present invention can be simplified and a manufacturing cost can be reduced.

Further, since the conventional manufacturing method has a problem that a dimensional pitch of a black mask and a color filter becomes misaligned, it is difficult to set a width of the black mask to about 20 µm or less. However, since the color filters are masked in the present invention, the black mask can be processed to a thickness of about 10 µm or less, which improves an open area ratio of a color display portion of the LCD.

Further, since the present invention is constructed as described above, a light diffusing property can be provided by the minute hills and the valleys.

Furthermore, since the present invention is constructed as described above, it has such a feature that it can provide a STN type LCD which includes substrates having surface flatness of pinpoint accuracy, can secure high gap accuracy between the substrates, and has excellent display quality.

What is claimed is:

1. A reflective type LCD, comprising:

a substrate;

one color layer formed on an approximately overall surface of a display region of said substrate; and a reflective layer covering the other portion of said color layer excluding a desired pattern portion thereof, characterized in that the pattern of said one color layer is exposed through said reflective layer.

2. A black and white reflective type LCD, characterized in that, in a reflective type LCD according to claim 1, said one color layer is a black mask.

3. A color reflective type LCD, characterized in that, in a reflective type LCD according to claim 1, said one color layer is a black mask, a color filter having a blue filter, a green filter, and a red filter is disposed on said reflective layer, and edges of said color filter partly overlap said black mask.

4. A reflective type LCD, characterized in that, in a reflective type LCD according to claim 1, fine hills and valleys are formed on a surface of said one color layer.

5. A reflective type LCD, characterized in that, in a reflective type LCD according to claim 1, said LCD is a super twisted nematic type LCD.

* * * * *